(12) United States Patent
Katsuta

(10) Patent No.: US 11,325,300 B2
(45) Date of Patent: May 10, 2022

(54) SHAPING APPARATUS

(71) Applicant: FUJIFILM Business Innovation Corp., Tokyo (JP)

(72) Inventor: Nobuhiro Katsuta, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 364 days.

(21) Appl. No.: 16/548,789

(22) Filed: Aug. 22, 2019

(65) Prior Publication Data

US 2020/0230872 A1 Jul. 23, 2020

(30) Foreign Application Priority Data

Jan. 18, 2019 (JP) .............................. JP2019-007347

(51) Int. Cl.
*B29C 64/118* (2017.01)
*B29C 48/05* (2019.01)
*B29B 15/14* (2006.01)
*B29C 70/38* (2006.01)
*B29C 48/25* (2019.01)

(52) U.S. Cl.
CPC ............ *B29C 64/118* (2017.08); *B29B 15/14* (2013.01); *B29C 48/05* (2019.02); *B29C 48/2528* (2019.02); *B29C 70/384* (2013.01)

(58) Field of Classification Search
CPC ... B29C 64/118; B29C 48/2528; B29C 48/05; B29C 70/384; B29B 15/14
USPC .......................................... 264/163; 425/375
See application file for complete search history.

(56) References Cited

U.S. PATENT DOCUMENTS

| 10,046,511 | B1 | 8/2018 | Mantha | |
|---|---|---|---|---|
| 10,076,876 | B2 | 9/2018 | Mark et al. | |
| 2014/0291886 | A1 | 10/2014 | Mark et al. | |
| 2016/0311165 | A1* | 10/2016 | Mark | B29C 64/393 |
| 2017/0066187 | A1* | 3/2017 | Mark | B29C 48/154 |
| 2019/0232550 | A1 | 8/2019 | Mark et al. | |

FOREIGN PATENT DOCUMENTS

JP 2016518267 6/2016

* cited by examiner

*Primary Examiner* — Joseph S Del Sole
*Assistant Examiner* — Lawrence D. Hohenbrink, Jr.
(74) *Attorney, Agent, or Firm* — JCIPRNET

(57) ABSTRACT

A shaping apparatus includes a stand that includes a shaping surface on which a product is shaped; a feeder that feeds a linear material obtained by impregnating continuous fiber with resin; a pressing portion that presses the material fed by the feeder against the stand; and an angle setting portion that sets an angle formed between the material fed from the feeder to the pressing portion and the shaping surface to be an acute angle.

18 Claims, 12 Drawing Sheets

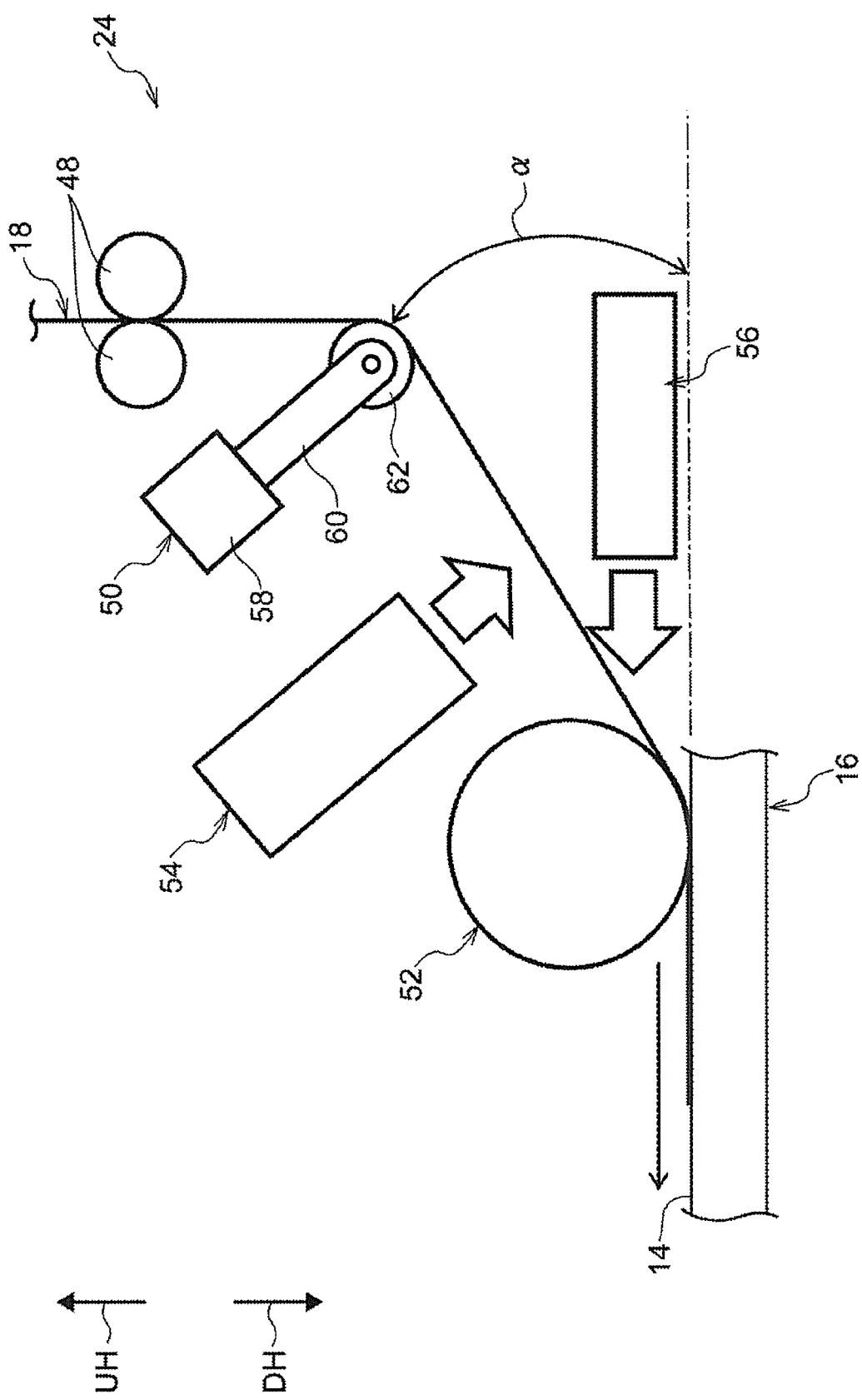

FIG. 4

| ANGLE (°) AT WHICH MATERIAL IS FED TO PRESSING PORTION | SURFACE FOLD | WAVINESS |
|---|---|---|
| 90 | POOR | POOR |
| 60 | POOR | POOR |
| 45 | FAIR | FAIR |
| 30 | GOOD | GOOD |
| 15 | GOOD | GOOD |

⬇ ACCEPTABLE RANGE

GOOD: NO FOLD
FAIR: SLIGHTLY FOLDED (ACCEPTABLE)
POOR: FOLDED

FIG. 9

| OUTER DIAMETER φ (mm) OF PRESSING PORTION | ANGLE (°) AT WHICH MATERIAL IS FED TO PRESSING PORTION | UNDER TENSION SURFACE FOLD | WAVINESS |
|---|---|---|---|
| 10 | 90 | POOR | POOR |
| | 60 | FAIR | POOR |
| | 45 | GOOD − | FAIR |
| | 30 | GOOD | GOOD |
| | 15 | GOOD | GOOD |
| 30 | 60 | FAIR | POOR |
| | 45 | GOOD − | FAIR |
| | 30 | GOOD | GOOD |
| | 15 | GOOD | GOOD |
| 50 | 60 | FAIR | POOR |
| | 45 | GOOD − | FAIR |
| | 30 | GOOD | GOOD |
| | 15 | GOOD | GOOD |
| 100 | 60 | FAIR | POOR |
| | 45 | GOOD − | FAIR |
| | 30 | GOOD | GOOD |
| | 15 | GOOD | GOOD |

FIG. 11

| RESIN MATERIAL | ANGLE (°) AT WHICH MATERIAL IS FED TO PRESSING PORTION | UNDER TENSION SURFACE FOLD | WAVINESS |
|---|---|---|---|
| PP | 60 | FAIR | POOR |
| | 45 | GOOD — | FAIR |
| | 30 | GOOD | GOOD |
| | 15 | GOOD | GOOD |
| PA6 | 60 | FAIR | POOR |
| | 45 | FAIR | FAIR |
| | 30 | GOOD | GOOD |
| | 15 | GOOD | GOOD |
| PA11 | 60 | FAIR | POOR |
| | 45 | FAIR | POOR |
| | 30 | GOOD | FAIR |
| | 15 | GOOD | GOOD |

CONDITION
· OUTER DIAMETER OF PRESSING PORTION: φ10

SHAPING APPARATUS

CROSS-REFERENCE TO RELATED APPLICATIONS

This application is based on and claims priority under 35 USC 119 from Japanese Patent Application No. 2019-007347 filed Jan. 18, 2019.

BACKGROUND

(i) Technical Field

The present disclosure relates to a shaping apparatus that provides a shape to a material.

(ii) Related Art

A three-dimensional printing system is known as an example of a shaping apparatus (refer to, for example, Japanese Unexamined Patent Application Publication (Translation of PCT Application) No. 2016-518267).

In this three-dimensional printing system, a reinforced filament without any voids is fed to an extrusion nozzle. The reinforced filament includes a continuous or semi-continuous core, and a matrix material surrounding the core. Before being extruded from the extrusion nozzle, the reinforced filament is heated to a temperature higher than the melting temperature of the matrix material and lower than the melting temperature of the core.

SUMMARY

Aspects of non-limiting embodiments of the present disclosure relate to a shaping apparatus capable of reducing surface folds on a material compared to a case where the material fed to a pressing portion and a shaping surface form an angle of 90 degrees.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a shaping apparatus including a stand that includes a shaping surface on which a product is shaped; a feeder that feeds a linear material obtained by impregnating continuous fiber with resin; a pressing portion that presses the material fed by the feeder against the stand; and an angle setting portion that sets an angle formed between the material fed from the feeder to the pressing portion and the shaping surface to be an acute angle.

BRIEF DESCRIPTION OF THE DRAWINGS

Exemplary embodiments of the present disclosure will be described in detail based on the following figures, wherein:

FIG. 2 is an enlarged view of a related portion of the shaping apparatus according to the first exemplary embodiment;

FIG. 3A is a side view of an apparatus, and FIG. 3B is a plan view of a material;

FIG. 4 is a table showing the relationship between a feed angle, a surface fold, and waviness according to the first exemplary embodiment;

FIG. 9 is a table showing the relationship between a feed angle, a surface fold, and waviness at each pressing portion according to the third exemplary embodiment;

FIG. 11 is a table showing the relationship between a feed angle, a surface fold, and waviness at each resin material portion according to the fourth exemplary embodiment.

DETAILED DESCRIPTION

First Exemplary Embodiment

A shaping apparatus 10 according to a first exemplary embodiment will be described by way of example with reference to the drawings. Throughout the drawings, the upward direction is indicated with arrow UH and the downward direction is indicated with arrow DH.

Figure 1:
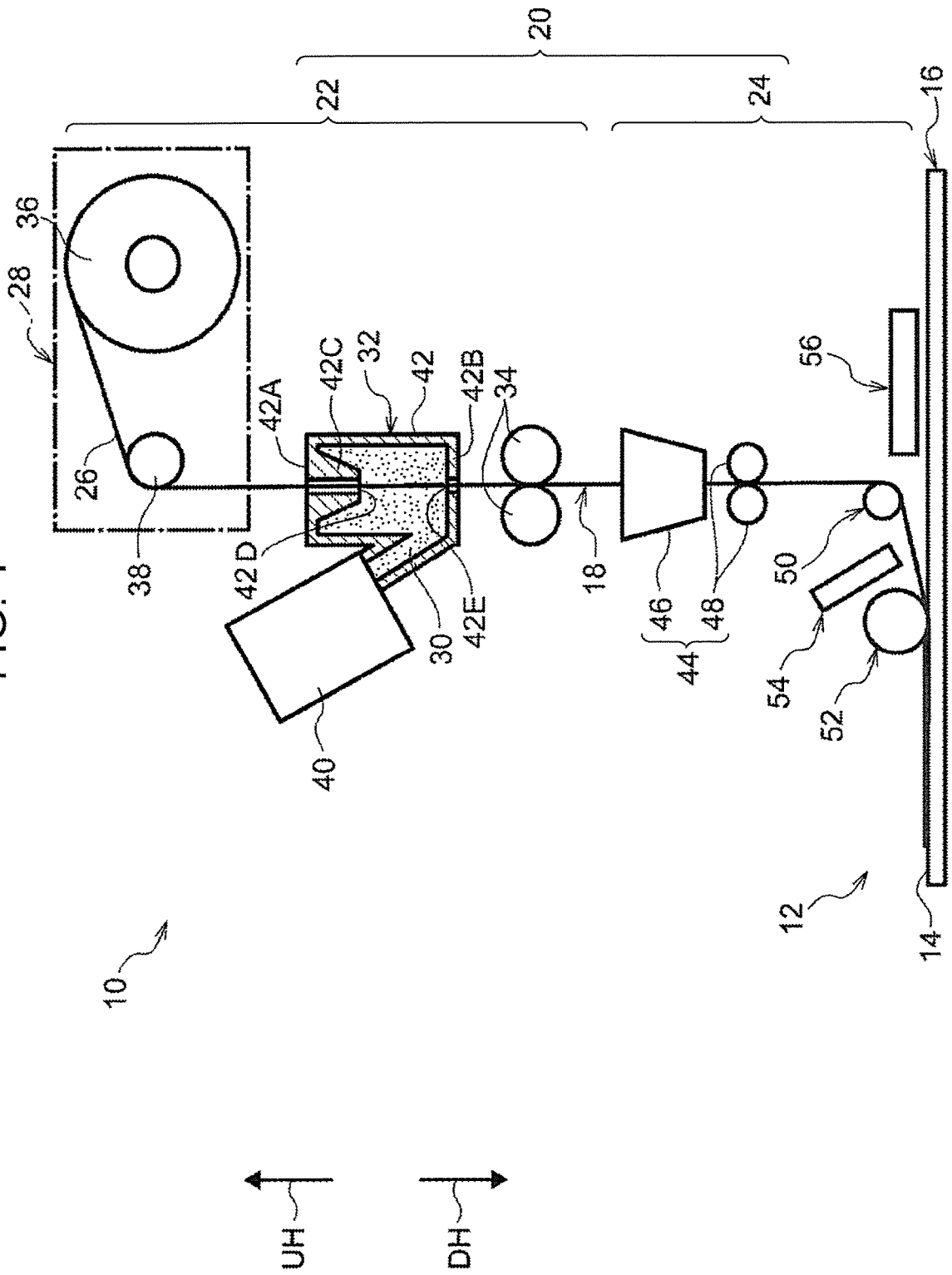
FIG. 1 is a schematic diagram of a shaping apparatus according to a first exemplary embodiment.

FIG. 1 illustrates the shaping apparatus 10 according to the present exemplary embodiment. The shaping apparatus 10 forms a three-dimensional product 12 based on shape data.

The shaping apparatus 10 includes a stand 16, including a shaping surface 14 on which the product 12 is shaped, and a feeding device 20, which feeds a material 18 onto the stand 16. The stand 16 is supported by, for example, a driving table (not illustrated). The driving table drives the stand 16 in a X-Y direction, the height direction (upward direction UH and downward direction DH), and the rotation direction based on the shape data of the product 12.

Thus, a shaping apparatus 1 shapes the material 18 fed by the feeding device 20 onto the stand 16 into the product 12 on the shaping surface 14.

The present exemplary embodiment describes a case where the product 12 is shaped by driving the stand 16 based on the shape data, but this is not the only possible example. For example, the product 12 may be shaped by driving the feeding device 20 with a manipulator based on the shape data.

Feeding Device

The feeding device 20 of the shaping apparatus 10 includes a material preparing portion 22, which prepares the material 18, and a shaping portion 24, which transports the material 18 from the material preparing portion 22 and shapes the material 18.

Material Preparing Portion

The material preparing portion 22 includes a continuous fiber feeder 28, which feeds a continuous fiber 26, and an impregnation portion 32, which impregnates the continuous fiber 26 fed from the continuous fiber feeder 28 with resin 30 to prepare the material 18. The material preparing portion 22 includes a pair of pull-out rollers 34, which pull out the material 18 from the impregnation portion 32 while holding the material 18 therebetween.

Continuous Fiber Feeder

The continuous fiber feeder 28 includes a reel 36, on which the continuous fiber 26 is wound, and a roller 38, which changes the direction in which the continuous fiber 26 pulled out from the reel 36 is transported.

The continuous fiber 26 is formed from multiple fiber strands. The fiber strands of the continuous fiber 26 are formed from, for example, carbon fiber, but may be formed from glass fiber. A single strand of the continuous fiber 26 has a diameter of 5 µm to 30 µm. Several hundred to several tens of thousand strands of the continuous fiber 26 are collectively pulled out from the reel 36.

Impregnation Portion

The impregnation portion 32 includes a resin feeder 40, filled with the resin 30, and a hollow cylindrical casing 42, to which the resin 30 is fed from the resin feeder 40. An example of the resin 30 fed from the resin feeder 40 is a thermoplastic resin. This resin 30 is formed from, for example, melted polypropylene (PP), which has a melting point of approximately 160° C.

The present exemplary embodiment describes a case where PP is used as an example of the resin 30, but this is not the only possible example. For example, the resin 30 may be formed from polyamide (PA, or nylon), polystyrene (PPS), polycarbonate (PC), polyetheretherketone (PEEK), polyether-imide (PEI), polyamide 6 (PA 6, or nylon 6), or polyamide 11 (PA 11).

The upper end of the casing 42 is closed with an upper surface 42A, and the lower end of the casing 42 is closed with an undersurface 42B. A nozzle portion 42C, which tapers in the downward direction DH is integrally formed on the upper surface 42A. A through-hole 42D vertically extends through the upper surface 42A and the nozzle portion 42C. A through-hole 42E vertically extends through the undersurface 42B. The continuous fiber 26 extends through the through-holes 42D and 42E.

Thus, when a bundle of multiple strands of the continuous fiber 26 passes through the casing 42, a linear material 18 including the strands of the continuous fiber 26 impregnated with the resin 30 is prepared. The material 18 thus prepared is rephrased as fiber-reinforced resin, which is the resin 30 reinforced with the continuous fiber 26.

Shaping Portion

The shaping portion 24 includes a feeder 44, which feeds the material 18 prepared by the material preparing portion 22. The feeder 44 includes a guide portion 46, which guides the material 18 fed from the material preparing portion 22, and a pair of pull-out rollers 48, which pull out the material 18 from the guide portion 46 by holding the material 18 therebetween.

The shaping portion 24 includes an angle setting portion 50, which changes the direction of the material 18 from the feeder 44 to a direction in which the material 18 is to be fed, and a pressing portion 52, which presses the material 18 fed by the feeder 44 via the angle setting portion 50 against the stand 16 in the downward direction DH.

As also illustrated in FIG. 2, the shaping portion 24 includes a first heating portion 54 and a second heating portion 56, which heat the material 18 to be fed to the pressing portion 52 to a temperature higher than or equal to the melting point of the resin 30 of the material 18.

The first heating portion 54 heats the material 18 between the angle setting portion 50 and the pressing portion 52 from upward UH, in other words, from the side opposite to the shaping surface 14 to heat the portion of the material 18 located opposite to the shaping surface 14. The second heating portion 56 heats the material 18 between the angle setting portion 50 and the pressing portion 52 from sideways, in other words, in the direction along the shaping surface 14 to heat the portion of the material 18 facing the shaping surface 14. In other words, the material 18 is heated from both surfaces in a lamination direction.

The temperature to which the material 18 is heated by the first heating portion 54 and the second heating portion 56 is 250° C., which is higher than or equal to the melting point of PP, forming the resin 30. The material 18 is fed to the pressing portion 52 while the resin 30 impregnated into the strands of the continuous fiber 26 is melted.

Examples of the first heating portion 54 and the second heating portion 56 include a heating member that heats the material 18. Examples of such a heating member include a warm-air blower, which blows warm air to the material 18 to heat the material 18, a laser device, which irradiates the material 18 with laser beams to heat the material 18, and a heater that heats the material 18 with radiant heat. Examples of such a Heater Include a Halogen Heater.

In the present exemplary embodiment, the first heating portion 54 is formed of a heater, and the second heating portion 56 is formed of a warm-air blower.

The pressing portion 52 is formed of a solid cylindrical roller to press the fed material 18 against the stand 16 to squash the material 18. Thus, the pressing portion 52 flattens the material 18 and fixes the material 18 by holding the material 18 between itself and the shaping surface 14. Multiple layers of the material 18 vertically stacked one on another are firmly bonded together.

The angle setting portion 50 includes a setting portion body 58, a lever 60, which extends in the obliquely downward direction DH with respect to the setting portion body 58, and a setting roller 62, rotatably supported at the leading end portion of the lever 60. The setting roller 62 is in contact with the material 18 from the side opposite to the shaping surface 14 at a position between the pull-out rollers 48 of the shaping portion 24 and the pressing portion 52 to restrict the path of the material 18.

The setting portion body 58 is capable of adjusting the length of the lever 60 in the longitudinal direction by which the lever 60 protrudes obliquely downward. Thus, the angle setting portion 50 is capable of controlling a feed angle α, which is an example of an angle formed between the material 18 fed to the pressing portion 52 from the pull-out rollers 48 of the shaping portion 24 and the shaping surface 14, and sets the feed angle α to be an acute angle.

Specifically, the angle setting portion 50 controls the length of the lever by which the lever protrudes from the setting portion body 58 so that the feed angle α is smaller than or equal to 45 degrees. The angle setting portion 50 also controls the length of the lever 60 by which the lever 60 protrudes from the setting portion body 58 so that the feed angle α is larger than or equal to 15 degrees to secure a space for the second heating portion 56 to be installed near the pressing portion 52.

Operations

The operations of the present exemplary embodiment with the above structure will be described.

The present exemplary embodiment includes the angle setting portion 50, which sets the feed angle α, which is an angle formed between the material 18 fed from the feeder 44 to the pressing portion 52 and the shaping surface 14, to be an acute angle. In the present exemplary embodiment, the angle setting portion 50 is manually adjusted to set the feed angle α to be an acute angle, but may be automatically adjusted.

Compared to the case where the angle formed between the material 18 fed to the pressing portion 52 and the shaping surface 14 is 90 degrees, this structure reduces surface folds that may be caused in the material 18, and prevents reduction of the strength of the material 18.

Comparative Example

Figure 3A:
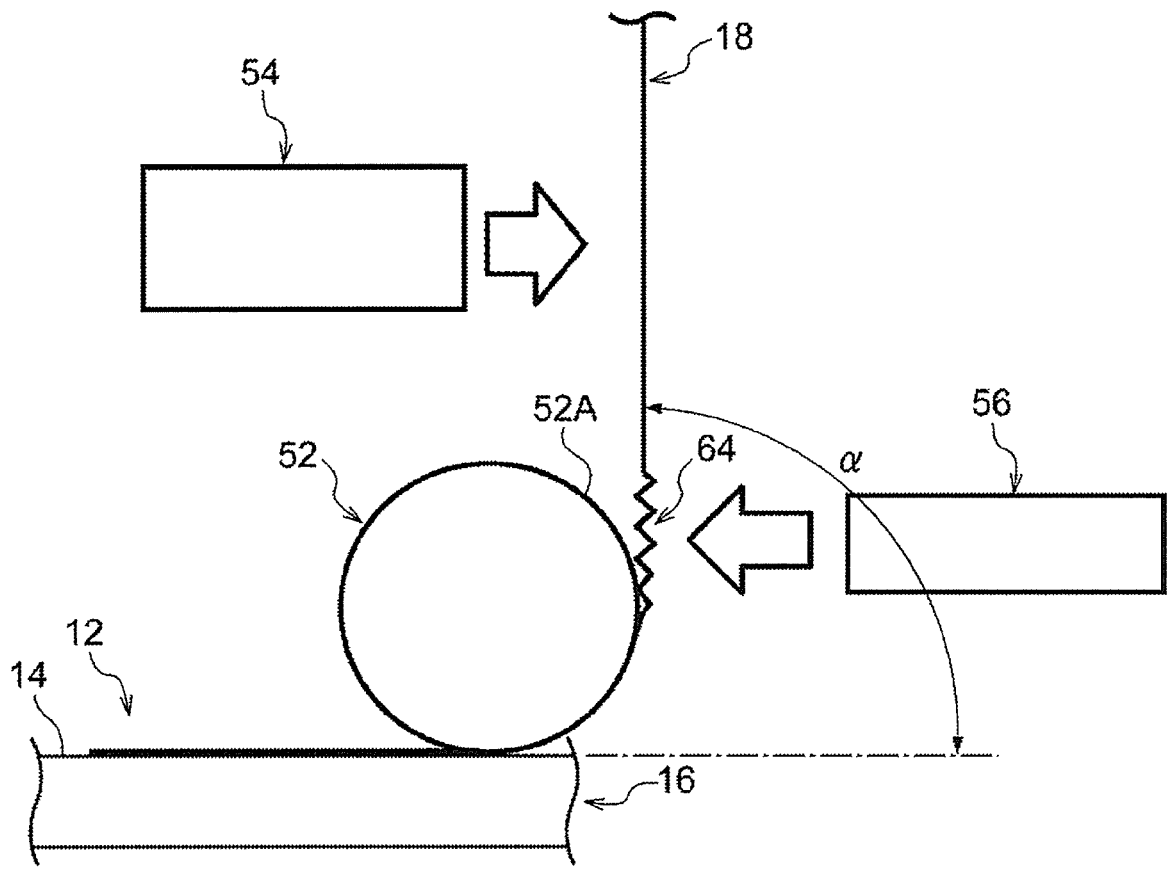
FIGS. 3A and 3B illustrate a comparative example, where
Figure 3B:
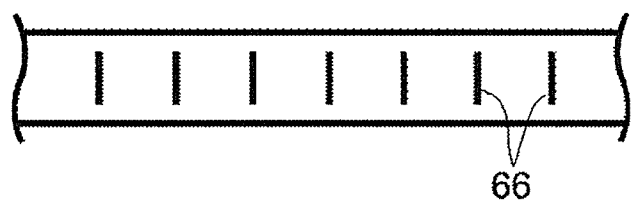

A comparative example will be described here with reference to FIGS. 3A and 3B.

In this comparative example, the material 18 hanging down from the feeder 44 is fed to the pressing portion 52, and the feed angle α formed between the material 18 and the shaping surface 14 is set to a right angle (90 degrees).

Here, the material 18 that has received warm air from the warm-air blower formed by the second heating portion 56 causes waviness 64 immediately in front of the pressing portion 52. The material 18 in this state is bent along a circumferential surface 52A of the pressing portion 52, and pressed by the pressing portion 52. Then, while passing by the pressing portion 52, the material 18 causes cracking on the surface due to the difference in degree of stretching between the surface and undersurface of the material 18, in other words, the material 18 causes surface folds 66, which may reduce the strength of the material 18.

In the present exemplary embodiment, in contrast, the feed angle α of the material 18 fed to the pressing portion 52 is set to an acute angle, so that the length of the material 18 by which the material 18 is wound around the circumferential surface 52A of the pressing portion 52 is reduced.

Compared to the case where the feed angle α is 90 degrees, this structure prevents reduction of the strength of the material 18, enhances the strength of the product 12 formed from the material 18, and reduces cracking that may be caused on the shaped surface of the product 12.

The angle setting portion 50 sets the feed angle α to an angle smaller than or equal to 45 degrees. Thus, compared to the case where the angle formed between the material 18 and the shaping surface 14 is larger than 45 degrees, reduction of the strength of the material 18 is further prevented.

Here, an excessively small feed angle α would hinder securing of a space for the second heating portion 56 to be installed near the pressing portion 52, and may keep the second heating portion 56 at a distance from the pressing portion 52.

To address this, in the present exemplary embodiment, to secure a space for the second heating portion 56 to be installed near the pressing portion 52, the angle setting portion 50 controls the length of the lever 60 by which the lever 60 protrudes from the setting portion body 58 so that the feed angle α is set to be larger than or equal to 15 degrees.

Compared to the case where the angle formed between the material 18 and the shaping surface 14 is smaller than 15 degrees, this structure secures a space for the second heating portion 56, which heats the material 18, to be installed near the pressing portion 52.

Results of Experiments

FIG. 4 is a table showing the results of experiments using the shaping apparatus 10 according to the first exemplary embodiment, which shows the relationship between the feed angle α, the surface folds 66, and the waviness 64.

In the following results of experiments, "GOOD" refers to "no occurrence" of the surface folds and waviness, and "FAIR" refers to "slight occurrence within acceptable range" of the surface folds and waviness. "POOR" refers to "occurrence" of the surface folds and waviness, and "GOOD-" refers to "slight occurrence but fewer than FAIR" of the surface folds and waviness (refer to FIG. 7).

This tables shows that the surface folds 66 occur in the material 18 when the feed angle α exceeds 45 degrees, and the waviness 64 occurs in the material 18 when the feed angle α exceeds 45 degrees.

The results of experiments reveal that the feed angle α is preferably smaller than or equal to 45 degrees not to cause the surface folds 66 on the material 18 in the shaping apparatus 10 according to the present exemplary embodiment.

FIG. 4 is a table showing the results of experiments conducted using the shaping apparatus 10 according to the present exemplary embodiment and using the material 18 containing the materials described in the present exemplary embodiment.

The present exemplary embodiment includes the impregnation portion 32, which impregnates the continuous fiber 26 with the resin 30 to form the material 18.

Here, the material 18 cured after impregnating the continuous fiber 26 with the resin 30 is solid. To directly feed the material 18, the reel that holds the material 18 while allowing the material 18 to be wound therearound has to have a large diameter.

The present exemplary embodiment includes the impregnation portion 32, which impregnates the continuous fiber 26 with the resin 30 to form the material 18. Thus, the reel 36 that allows the continuous fiber 26 having higher flexibility than the material 18 to be wound therearound may have a smaller diameter.

Thus, the device is allowed to have a smaller size than in the case where the device feeds the material 18.

The shaping apparatus 10 includes the first heating portion 54 and the second heating portion 56, which heat the material 18 fed to the pressing portion 52 to a temperature higher than or equal to the melting point of the resin 30 of the material 18. When the resin 30 of the material 18 pressed by the pressing portion 52 melts, the material 18 is softened to be prevented from the surface cracking 66.

Thus, reduction of the strength of the material 18 is further prevented than in the case where the material 18 is not heated.

Second Exemplary Embodiment

Figure 5:
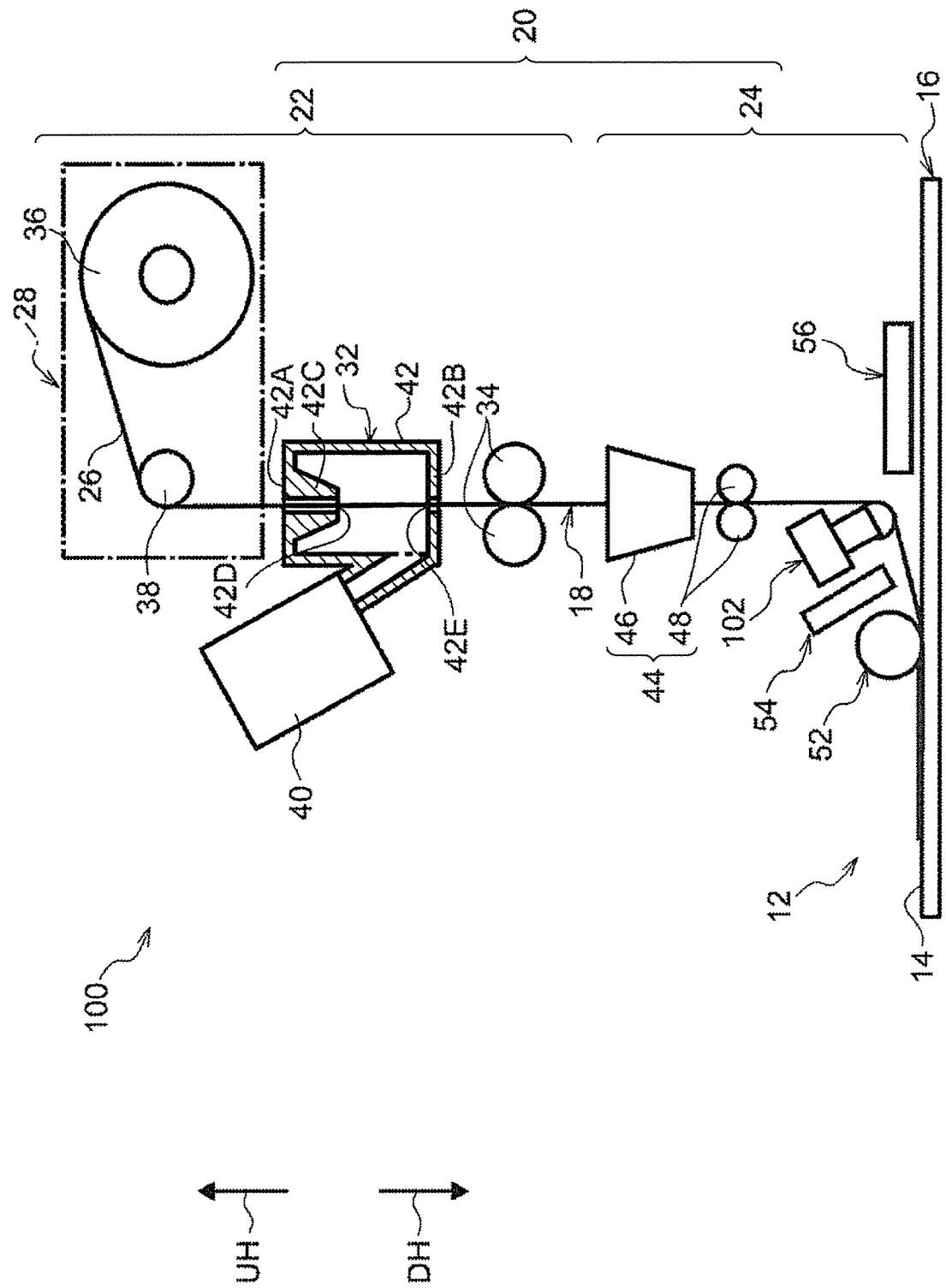
FIG. 5 is a schematic diagram of a shaping apparatus according to a second exemplary embodiment.
Figure 6:
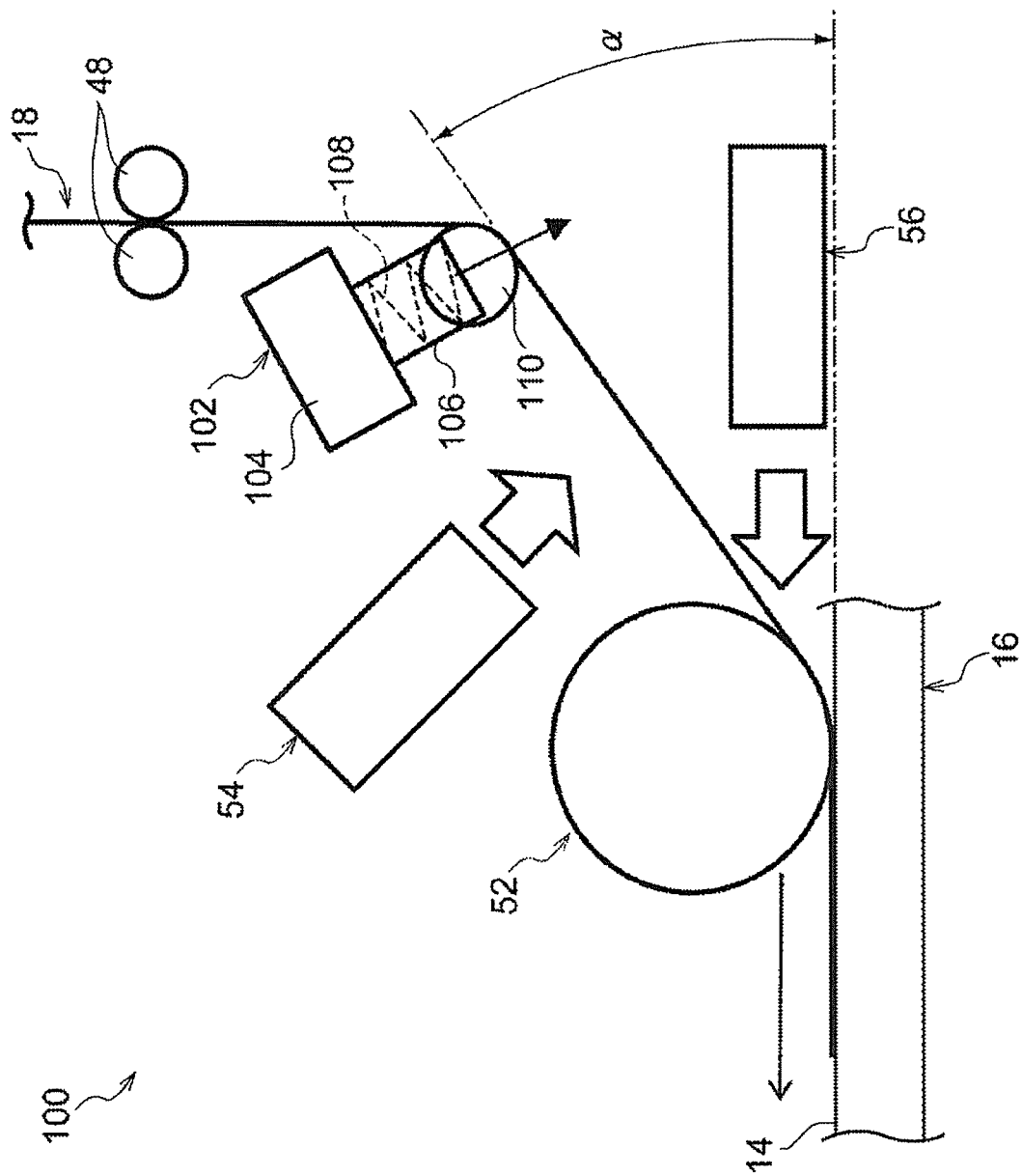
FIG. 6 is an enlarged view of a related portion of the shaping apparatus according to the second exemplary embodiment.
Figure 7:
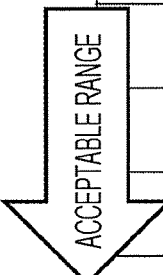
FIG. 7 is a table showing the relationship between a feed angle, a surface fold, and waviness under tension according to the second exemplary embodiment.

FIG. 5 to FIG. 7 illustrate a shaping apparatus 100 according to a second exemplary embodiment. Components the same or similar to those of the first exemplary embodiment are denoted with the same reference signs without description, and only different components are described.

The shaping apparatus 100 according to the present exemplary embodiment differs from that according to the first exemplary embodiment in terms of an angle setting portion 102. The angle setting portion 102 presses the material 18 from the side opposite to the shaping surface 14 to exert tension on the material 18, and has a function of maintaining the tension caused in the material 18 within a given range.

Specifically, a tensioning member 108 is installed in a lever 106 whose length in the longitudinal direction by which the lever 106 protrudes from a setting portion body 104 of the angle setting portion 102 is adjusted. At the leading end of the tensioning member 108, a setting roller 110 is rotatably supported.

An example of the tensioning member 108 is a coil spring that extends in the longitudinal direction of the lever 106. A spring force within a given range in which a coil spring occurs is exerted as tension on the material 18 with which the setting roller 110 is in contact.

Operations

The present exemplary embodiment also achieves the operations the same as those of the first exemplary embodiment.

The angle setting portion 102 maintains the tension caused in the material 18 within a given range. Thus, the surface folds are further prevented from being formed in the material 18 and reduction of the strength of the material 18 is further prevented than in the case where tension is not exerted on the material 18.

The angle setting portion 102 presses the material 18 from the side opposite to the shaping surface 14 to exert the tension on the material 18, and thus has a simpler structure than in the case where the material 18 is pressed from the shaping surface 14 to receive tension.

By exerting tension on the material 18 having a surface made uneven with heat, the material 18 is pulled to reduce the unevenness, and reduction of the elastic force of the material 18 is prevented. Thus, when the material 18 with no unevenness comes into contact with the pressing portion 52, no folds are formed on the surface of the material 18.

Results of Experiments

FIG. 7 is a table showing the results of experiments conducted using the shaping apparatus 100 according to the present exemplary embodiment, and shows the relationship between the feed angle α, the surface folds 66, and the waviness 64 in the state where the angle setting portion 102 exerts tension on the material 18.

This table shows that the surface folds 66 are more easily formed as the feed angle α is larger, and that exerting tension on the material 18 further reduces the level of the surface folds 66 and the waviness 64 compared to the first exemplary embodiment.

Third Exemplary Embodiment

Figure 8:
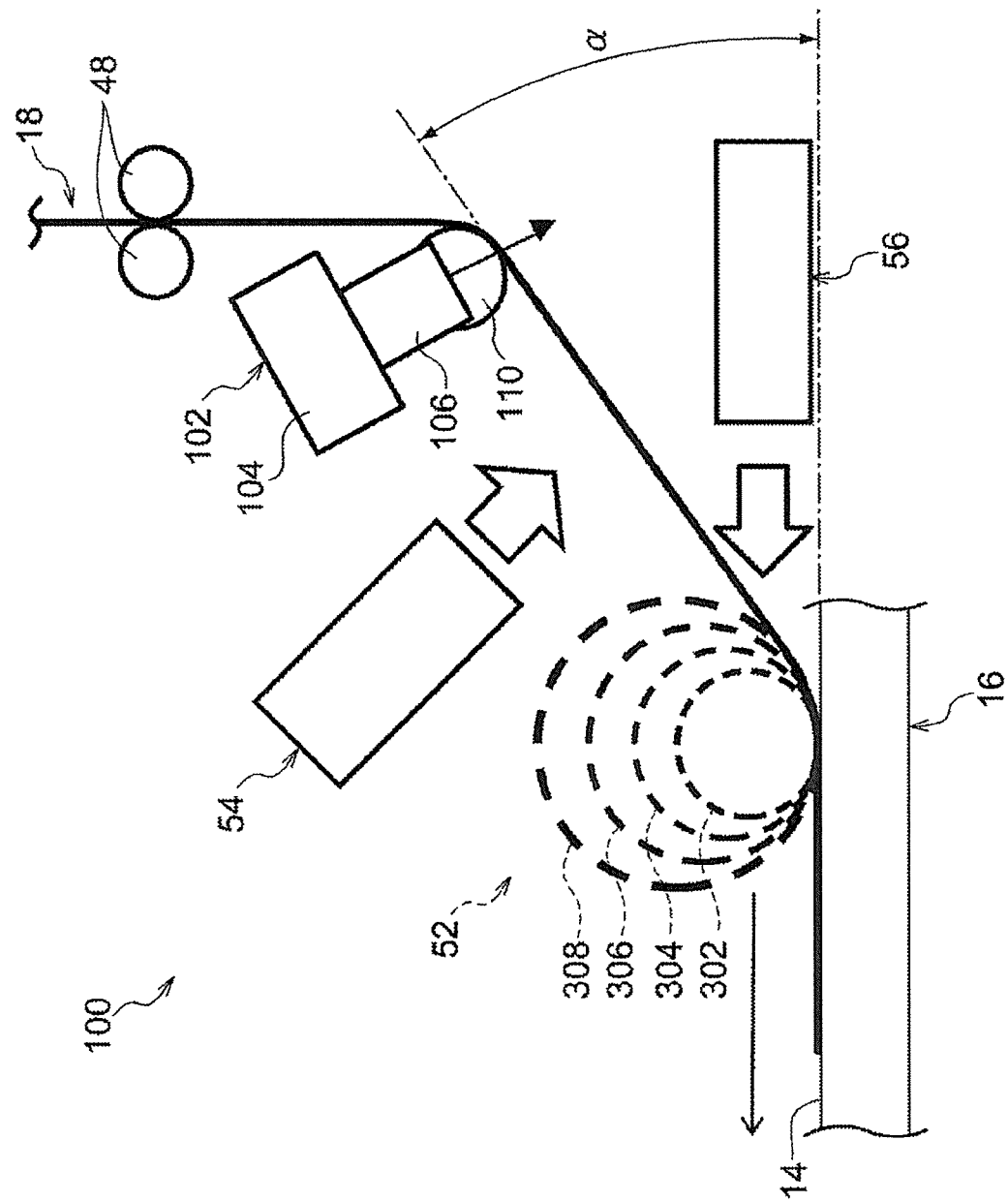
FIG. 8 is an enlarged view of a related portion of a shaping apparatus according to a third exemplary embodiment.

FIG. 8 and FIG. 9 illustrate a shaping apparatus 100 according to a third exemplary embodiment. Components the same or equivalent to those of the first exemplary embodiment and the second exemplary embodiment are denoted with the same reference signs without being described. Only different components will be described.

The shaping apparatus 100 according to the present exemplary embodiment differs from that according to the second exemplary embodiment in terms of the outer diameter of a roller constituting the pressing portion 52.

The present exemplary embodiment includes a first roller 302 to a fourth roller 308, having different outer diameters. This shaping apparatus 100 is capable of monitoring the surface fold 66 and the waviness 64 of the material 18 while switching the rollers 302 to 308 from one to another.

The first roller 302 has an outer diameter of 10 mm, and the second roller 304 has an outer diameter of 30 mm. The third roller 306 has an outer diameter of 50 mm, and the fourth roller 308 has an outer diameter of 100 mm.

Results of Experiments

FIG. 9 is a table showing the results of experiments according to the present exemplary embodiment, which shows the relationship between the feed angle α, the surface folds 66, and the waviness 64 while the angle setting portion 102 exerts tension on the material 18 using each of the rollers 302 to 308.

The tension on the material 18 is adjusted to be constant while the feed angle α is changed.

This table shows that the surface folds 66 occur in the material 18 when the feed angle α becomes larger than 45 degrees regardless of the outer diameter of the pressing portion 52.

Operations

The present exemplary embodiment also achieves operations the same as those of the first exemplary embodiment.

The present exemplary embodiment reveals that the surface folds 66 of the material 18 are largely affected by the feed angle α regardless of the outer diameter direction of the pressing portion 52.

Fourth Exemplary Embodiment

Figure 10:
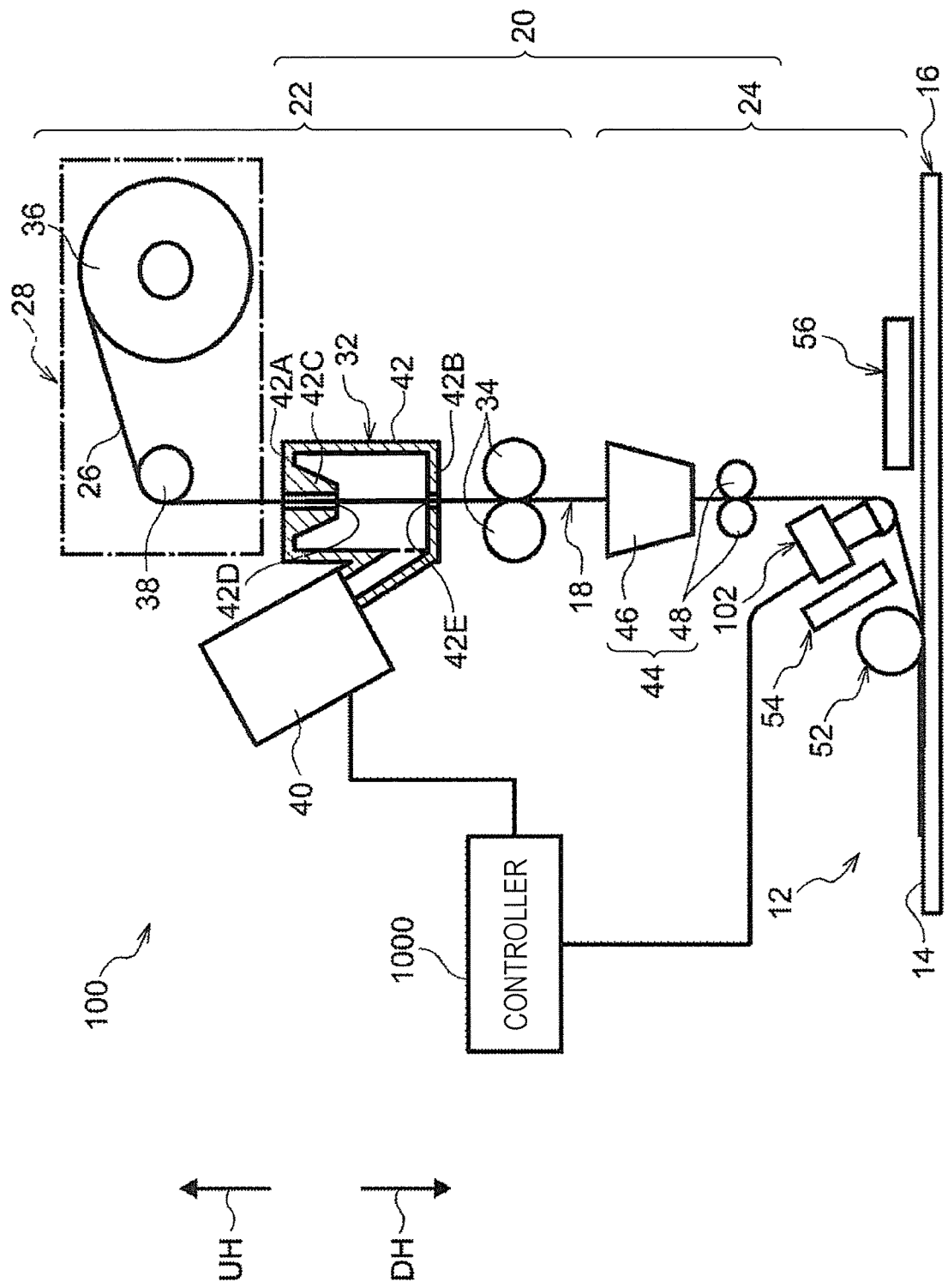
FIG. 10 is an enlarged view of a related portion of a shaping apparatus according to a fourth exemplary embodiment.

FIG. 10 and FIG. 11 illustrate a fourth exemplary embodiment. Components the same or equivalent to those of the first exemplary embodiment and the second exemplary embodiment are denoted with the same reference signs without being described. Only different components will be described here.

In a shaping apparatus 100 according to the present exemplary embodiment, a resin feeder 40 included in the impregnation portion 32 is replaceable. The shaping apparatus 100 according to the present exemplary embodiment includes multiple resin feeders 40 filled with different resins 30 to replace the resin feeder 40 of the impregnation portion 32 with any of the resin feeders 40 filled with different resins 30.

This shaping apparatus 100 includes a controller 1000. The controller 1000 identifies the type of the resin 30 fed from the attached resin feeder 40. The controller 1000 drives an actuator installed in the angle setting portion 102 in accordance with the identified type of the resin 30 to control the length of the lever 106 by which the lever 106 protrudes from the setting portion body 104. Thus, the shaping apparatus 100 adjusts the feed angle α and the tension exerted on the material 18 in accordance with the type of the resin 30 of the material 18.

Results of Experiments

FIG. 11 is a table showing the results of experiments according to a fourth exemplary embodiment, and describes an experiment conducted in the present exemplary embodiment.

The resin feeder 40 of the impregnation portion 32 was replaced with any of the resin feeders 40 filled with different resins 30, and the resin material of the resin 30 with which the continuous fiber 26 is impregnated was changed to form the material 18. In each material 18, the relationship between the feed angle α, the surface folds 66, and the waviness 64 in the state where the angle setting portion 102 exerts tension on the material 18 was checked.

The tension on the material 18 is adjusted to be constant even with a change of the feed angle α. The pressing portion 52 has an outer diameter of 10 mm.

This table shows that the feed angle α at which the surface fold 66 occurs differs depending on the type of the used resin 30.

This is probably caused due to the difference of the hardness between PP and PA 6 and PA 11, which are harder than PP, by being largely affected by the hardness of the resin 30 that has cured after melted.

From this result and the results of experiments shown in FIG. 7 with the tension exerted taken into consideration, the shaping apparatus 100 according to the present exemplary embodiment adjusts the feed angle α and tension in accordance with the type of the resin 30 of the material 18.

More specifically, in the shaping apparatus 100 according to the present exemplary embodiment, when PP or PA 6 is used as the resin 30, the controller 1000 controls the angle setting portion 102 to adjust the length of the lever 106 by which the lever 106 protrudes from the setting portion body 104 so that the feed angle α does not exceed 45 degrees.

In the shaping apparatus 100 according to the present exemplary embodiment, when PA 11 is used as the resin 30, the controller 1000 controls the angle setting portion 102 to adjust the length of the lever 106 by which the lever 106 protrudes from the setting portion body 104 so that the feed angle α does not exceed 30 degrees.

Operations

The present exemplary embodiment also achieves the operations the same as the first exemplary embodiment.

Compared to the case where only the feed angle α or the tension is adjusted, reduction of the strength of the material 18 is further prevented.

Fifth Exemplary Embodiment

Figure 12:
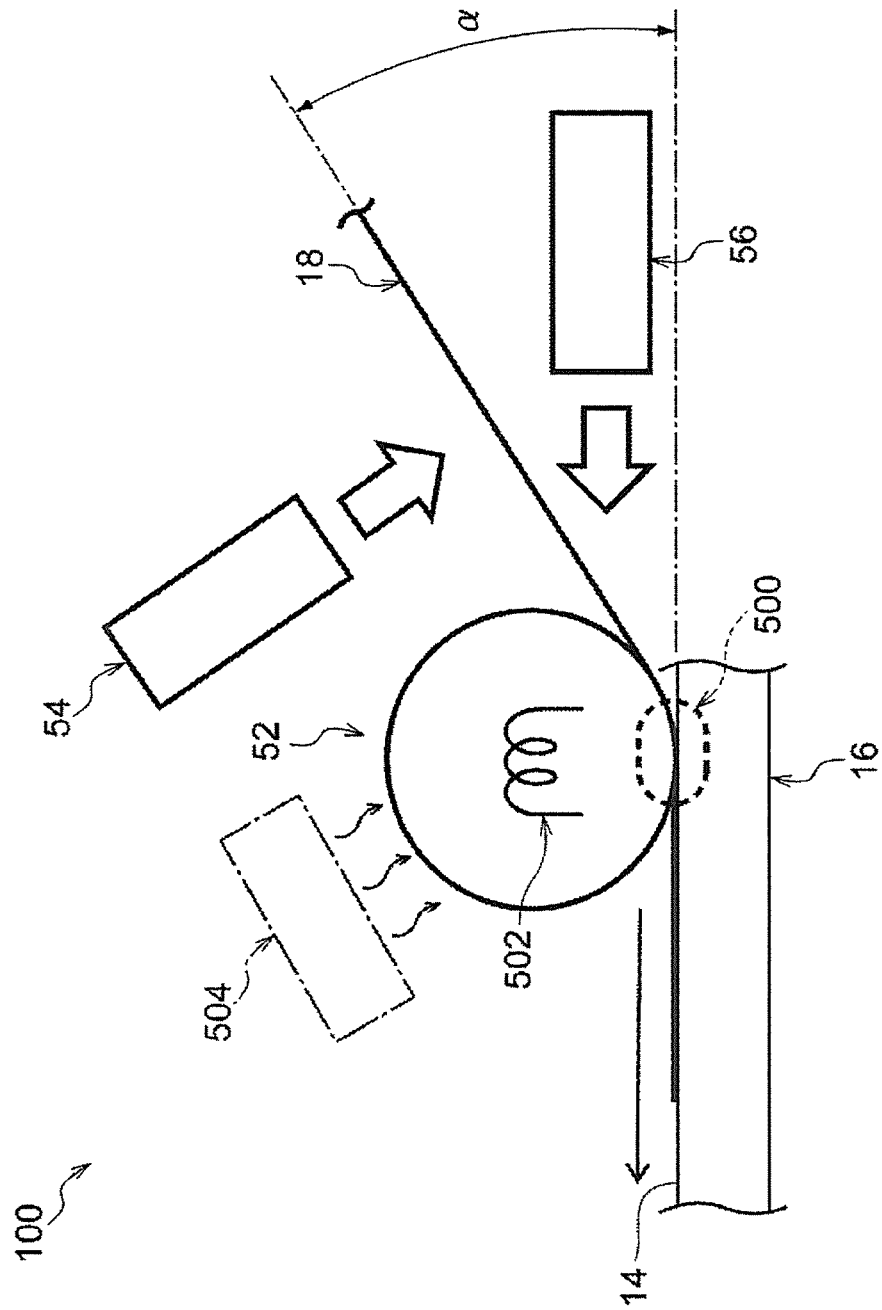
FIG. 12 is an enlarged view of a related portion of a shaping apparatus according to a fifth exemplary embodiment.

FIG. 12 illustrates a shaping apparatus 100 according to a fifth exemplary embodiment. Components the same as or equivalent to those of the first exemplary embodiment and the second exemplary embodiment are denoted with the same reference signs without being described. Only different components will be described.

The shaping apparatus 100 according to the present exemplary embodiment differs from that of the second exemplary embodiment in terms of the structure of the pressing portion 52. The pressing portion 52 heats the pressed material 18 to a temperature higher than or equal to the melting point of the resin 30 of the material 18 so that the material 18 has a temperature higher than or equal to the melting point over an area 500 over which the material 18 and the shaping surface 14 are in contact with each other.

Specifically, the pressing portion 52 is formed of a hollow cylindrical roller, and includes, inside the pressing portion 52, a heat source 502, which heats the resin 30 of the material 18 to a temperature higher than or equal to the melting point from the inside of the pressing portion 52. Examples of the heat source 502 include a heater. Examples of the heater include a heating wire and a halogen heater.

Other examples of a structure that heats the pressing portion 52 include, as indicated with broken lines in the drawing, an external heating device 504, which heats the pressing portion 52 from the outside to a temperature higher than or equal to the melting point of the resin 30 of the material 18.

Examples of the external heating device 504 include a warm-air blower, which provides warm air to the outer circumferential surface of the pressing portion 52 to heat the surface, and a laser device, which irradiates the outer circumferential surface of the pressing portion 52 with laser beams to heat the surface. Examples of the external heating device 504 include a heater that provides heat to the outer circumferential surface of the pressing portion 52 to heat the surface.

Operations

The present exemplary embodiment also achieves operations the same as those of the first exemplary embodiment.

The material 18 pressed by the pressing portion 52 is heated to a temperature higher than or equal to the melting point of the resin 30 of the material 18. Thus, reduction of the strength of the material 18 is further prevented than in the case where the pressing portion 52 does not heat the material 18.

The material 18 is allowed to be heated over the area 500 over which the pressing portion 52 brings the material 18 into contact with the shaping surface 14. This structure enhances the heating efficiency compared to the case where the material 18 is heated from a portion away from the area 500.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A shaping apparatus comprising:
    a stand that includes a shaping surface on which a product is shaped;
    a feeder that feeds a linear material obtained by impregnating continuous fiber with resin;
    a pressing portion, comprising a roller, that presses the material fed by the feeder against the stand; and
    an angle setting portion, comprising a roller disposed between the feeder and the pressing portion, that sets an angle formed between the material fed from the feeder to the pressing portion and the shaping surface to be an acute angle.

2. The shaping apparatus according to claim 1,
    wherein the angle setting portion sets the angle to be smaller than or equal to 45 degrees.

3. The shaping apparatus according to claim 2,
    wherein the angle setting portion sets the angle to be larger than or equal to 15 degrees.

4. The shaping apparatus according to claim 1,
    wherein the angle setting portion maintains tension exerted on the material within a given predetermined range.

5. The shaping apparatus according to claim 2,
    wherein the angle setting portion maintains tension exerted on the material within a predetermined range.

6. The shaping apparatus according to claim 3,
    wherein the angle setting portion maintains tension exerted on the material within a predetermined range.

7. The shaping apparatus according to claim 4,
    wherein the angle setting portion presses the material from a side opposite to the shaping surface to exert tension on the material.

8. The shaping apparatus according to claim 5,
wherein the angle setting portion presses the material from a side opposite to the shaping surface to exert tension on the material.

9. The shaping apparatus according to claim 6,
wherein the angle setting portion presses the material from a side opposite to the shaping surface to exert tension on the material.

10. The shaping apparatus according to claim 4,
wherein the angle setting portion adjusts the angle and the tension in accordance with a type of the resin of the material.

11. The shaping apparatus according to claim 5,
wherein the angle setting portion adjusts the angle and the tension in accordance with a type of the resin of the material.

12. The shaping apparatus according to claim 6,
wherein the angle setting portion adjusts the angle and the tension in accordance with a type of the resin of the material.

13. The shaping apparatus according to claim 7,
wherein the angle setting portion adjusts the angle and the tension in accordance with a type of the resin of the material.

14. The shaping apparatus according to claim 8,
wherein the angle setting portion adjusts the angle and the tension in accordance with a type of the resin of the material.

15. The shaping apparatus according to claim 9,
wherein the angle setting portion adjusts the angle and the tension in accordance with a type of the resin of the material.

16. The shaping apparatus according to claim 1, further comprising:
an impregnation portion that impregnates the continuous fiber with the resin to form the material.

17. The shaping apparatus according to claim 1, further comprising:
a heating portion that heats the material fed to the pressing portion to a temperature higher than or equal to a melting point of the resin of the material.

18. The shaping apparatus according to claim 1,
wherein the pressing portion heats the pressed material to a temperature higher than or equal to a melting point of the resin of the material.

* * * * *